(12) United States Patent
Kobori et al.

(10) Patent No.: US 10,089,911 B2
(45) Date of Patent: Oct. 2, 2018

(54) SCANNING DISPLAY DEVICE

(71) Applicant: Maxell, Ltd., Kyoto (JP)

(72) Inventors: Tomoki Kobori, Tokyo (JP); Yoshiho Seo, Tokyo (JP); Yuya Ogi, Tokyo (JP); Satoshi Ouchi, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/309,896

(22) PCT Filed: May 16, 2014

(86) PCT No.: PCT/JP2014/063023
§ 371 (c)(1),
(2) Date: Nov. 9, 2016

(87) PCT Pub. No.: WO2015/173942
PCT Pub. Date: Nov. 19, 2015

(65) Prior Publication Data
US 2017/0140689 A1 May 18, 2017

(51) Int. Cl.
*G09G 5/02* (2006.01)
*G09G 3/02* (2006.01)
(Continued)

(52) U.S. Cl.
CPC ........... *G09G 3/025* (2013.01); *G02B 26/101* (2013.01); *G02B 26/105* (2013.01);
(Continued)

(58) Field of Classification Search
CPC ........... G09G 3/025; G09G 2320/0626; G09B 26/101; G09B 26/105; H04N 9/3135; H04N 9/3161
(Continued)

(56) References Cited

U.S. PATENT DOCUMENTS

2012/0127184 A1* 5/2012 Satoh .................. H04N 9/3129
345/530
2012/0169777 A1* 7/2012 Budni ...................... G09G 3/02
345/690

FOREIGN PATENT DOCUMENTS

JP 2006-343397 A 12/2006
JP 2007-086242 A 4/2007
(Continued)

OTHER PUBLICATIONS

International Search Report of PCT/JP2014/063023 dated Aug. 19, 2014.

*Primary Examiner* — Mark Regn
(74) *Attorney, Agent, or Firm* — Mattingly & Malur, PC

(57) ABSTRACT

The purpose of the present invention is to provide a laser scanning display device capable of achieving high-resolution projection display while ensuring that the luminance and the size of the pixels are uniform to maintain the quality of the projection display. The scanning display device is configured to apply noise from a dither noise generator (21) to a horizontal scanning position on an oscillating mirror (11,12) determined by a scanning position determination unit (13); normalize the horizontal scanning position to which the noise was applied using a normalizing unit (22); acquire a pixel address corresponding to the normalized horizontal scanning position by referring to a pixel address table (23); read pixel data corresponding to the pixel address from an image memory (14); and modulate laser light by driving a light source (17) for emitting the laser light.

9 Claims, 6 Drawing Sheets

(51) Int. Cl.
*G02B 26/10* (2006.01)
*H04N 9/31* (2006.01)

(52) U.S. Cl.
CPC ......... *H04N 9/3135* (2013.01); *H04N 9/3161* (2013.01); *G09G 2320/0626* (2013.01)

(58) Field of Classification Search
USPC ........................................................ 345/697
See application file for complete search history.

(56) References Cited

FOREIGN PATENT DOCUMENTS

| | | |
|---|---|---|
| JP | 4639973 B2 | 2/2011 |
| JP | 2011-059456 A | 3/2011 |
| JP | 2012-124880 A | 6/2012 |
| WO | 2013/047656 A1 | 4/2013 |

\* cited by examiner

SCANNING DISPLAY DEVICE

TECHNICAL FIELD

The present invention relates to a scanning display device.

BACKGROUND ART

The display device which displays images projected onto the screen through raster scanning of the beam has been known. For example, Patent Literature 1 discloses the method of modulating light intensity of the beam in accordance with the video information adapted to the beam scanning position by means of the micro-mirror which oscillates with resonance (horizontal direction) and dissonance (vertical direction) through a MEMS (Micro Electro Mechanical System) element upon projection of the image onto the screen by the raster scanning of beam.

The resonance property of the micro-mirror which is oscillated with the resonance varies depending on the usage condition, and the oscillation angle fluctuates as well. Such mirror is allowed to hold the resonance state and the oscillation angle under the PLL (Phase Locked Loop) control. However, the resonant period still fluctuates. Therefore, it is intended to realize the display of video images that retain the angle of view and the resolution even in the state that the resonance period constantly fluctuates.

CITATION LIST

Patent Literature

Patent Literature 1: Japanese Patent No. 4639973

SUMMARY OF INVENTION

Technical Problem

Higher resonance frequency and expanded oscillation quantity of the micro-mirror have achieved the display with resolution of 1024×768 (XGA), 1280×768 (WXGA: Wide Extended Graphics Array). Such display necessitates higher laser modulation frequency adapted to the resonance frequency and the resolution. Therefore, it is difficult to improve quality of the display image, and to achieve high luminance and high resolution. For example, in the case where the laser modulation frequency is fixed, insufficient resolving property of the display pixel may cause uneven pixel arrangement owing to arithmetic error at a certain scanning position in the horizontal scanning direction. This may cause non-uniformity in the pixel width, missing of pixel, uneven luminance and the like.

It is an object of the present invention to provide a laser scanning display device which is configured to implement the display with high resolution while retaining the display image quality and luminance upon expansion of the frame frequency, resolution, and angle of view to cope with high resonance frequency and increased oscillation quantity of the micro-mirror irrespective of the fixed laser modulation frequency.

Solution to Problem

The structure according to the invention will be employed for addressing the above-described problems.

The present invention includes a plurality of means for addressing the problem, taking the following description as an example. The scanning display device configured to project a laser light modulated with input image data by oscillation mirrors for scanning in vertical and horizontal directions includes an image memory for storing the input image data, a scanning position determination unit for determining scanning positions in the vertical and the horizontal directions of the oscillation mirrors, a laser control unit for acquiring a pixel address corresponding to the scanning position determined by the scanning position determination unit and reading the image data corresponding to the image address from the image memory, and a light source control drive unit for driving a light source to emit the laser light based on the image data read from the image memory so that the laser light is modulated. The laser control unit includes a dither noise generator for generating noise, a normalizing unit for adding the noise generated by the dither noise generator to a horizontal scanning position of the oscillation mirror, which has been determined by the scanning position determination unit, and normalizing the horizontal scanning position to which the noise is added, and a pixel address table which holds a pixel address corresponding to the horizontal scanning position. The pixel address corresponding to the horizontal scanning position normalized by the normalizing unit is acquired in reference to the pixel address table for reading the pixel data corresponding to the pixel address from the image memory.

Advantageous Effects of Invention

The present invention ensures to implement the display with high resolution while retaining the display image quality and luminance by enabling diffusion and equalization of the pixel address distribution while holding the pixel gravity center upon expansion of the frame frequency, resolution, and the angle of view to cope with high resonance frequency and increased oscillation quantity of the micro-mirror irrespective of the fixed laser modulation frequency.

DESCRIPTION OF EMBODIMENTS

Figure 1:
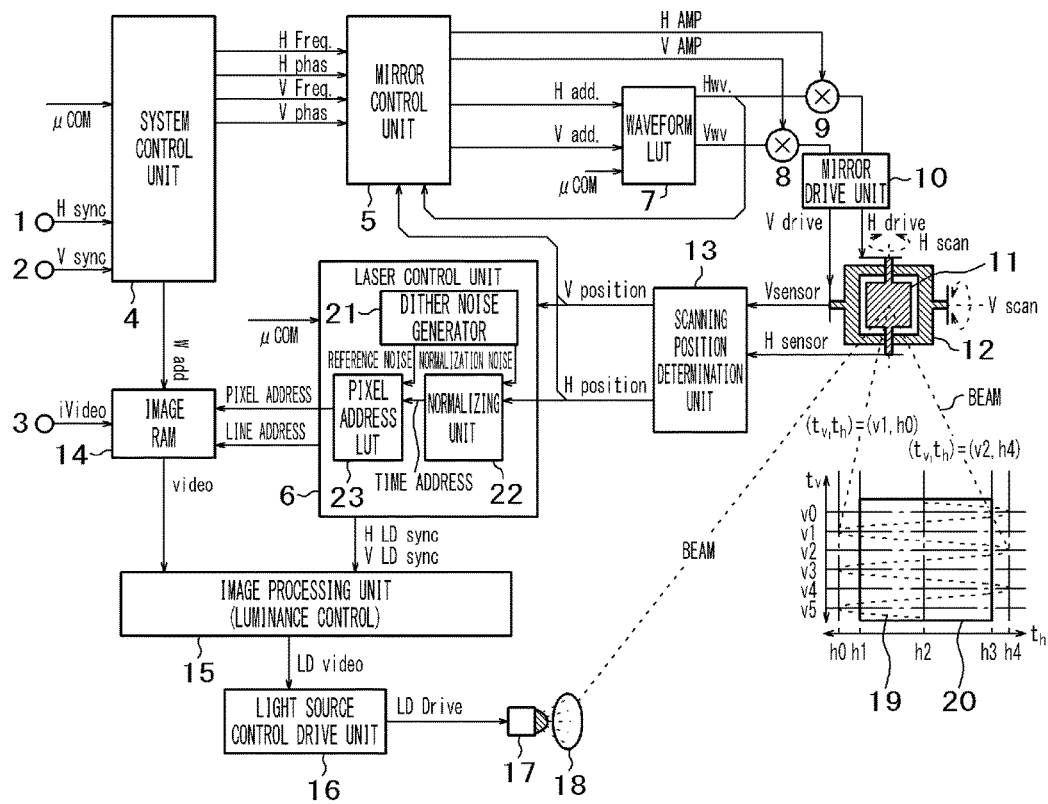
FIG. 1 is a block diagram of a scanning display device according to a first embodiment of the present invention.

Embodiments of the present invention will be described referring to the drawings. The component with the same structure, function or effect will be designated with the same reference numeral in the respective embodiments, the repetitive explanations of which will be omitted. The basic control method unique to the scanning projection type display device may be made reference to Patent Literature 1 as described above. The explanations of such control method in detail, thus, will be omitted. In the following embodiments, the numerical values are used in the restrictive way, but the number of mirrors, axial structure thereof, oscillation angle, resolution of the video image and the like may be arbitrarily determined despite that those values are small or large so long as they are determined in accordance with the applicable device and usage in the method described by the embodiments.

First Embodiment

Figure 2:
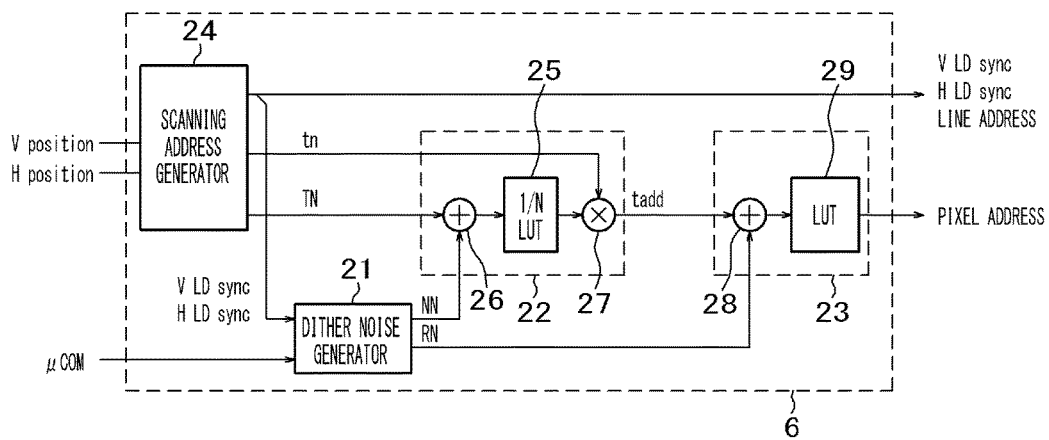
FIG. 2 is a block diagram of a laser control unit according to the first embodiment of the present invention in detail.

FIGS. 1 and 2 are block diagrams each showing a projection type display device according to the embodiment. The projection type display device of the embodiment exhibits 1280×768 (1280 horizontal pixels, 768 vertical pixels) WXGA display resolution. The display device employs the semiconductor laser which facilitates beam emission, and high-speed modulation of light quantity as a light source 17. A laser modulation clock with the fixed frequency of approximately 100 MHz is applied to the light source 17 so as to modulate the laser light by unit pixel. It is also possible to employ the LED light source, in place of the semiconductor laser, together with the optical components for condensing light in the beam-like state, and the components for modulating light quantity. A biaxial oscillation mirror 11 has an oscillation axis at the high-speed side of the resonance operation (hereinafter referred to as H-axis), and a biaxial oscillation mirror 12 has an oscillation axis at the low-speed side of the dissonance operation (hereinafter referred to as V-axis) each with a size of $\varphi L=1.0$ mm. Using the drive signal Hdrive at the drive frequency of fhm=approximately 30.0 kHz on the H-axis, and the drive signal Vdrive at the drive frequency of fvm=60 Hz on V-axis, those mirrors will be driven at the oscillation angle in the range from +/−θh to +/−θv (optical deflection angle from +/−26° to)+/−16°. The oscillation mirror may be driven through the arbitrary mirror oscillating process, for example, electromagnetic induction, piezoelectric actuation, electrostatic drive and the like. The oscillation angle may be adjusted in accordance with the amplitude of the drive signal Hdrive/Vdrive of the embodiment. The display range at the H-axis side is applicable to the whole region of the oscillation angle, that is, available without the fly-back period.

In general defining the point at which the radiant intensity of the beam reaches the peak value or $1/e^2$ of the value on the optical axis (13.5%) as the spot diameter (beam diameter), it is assumed that the spot diameter is equal to or smaller than $\varphi 1$ mm as the size sufficient to allow the display video image to satisfy the desired resolution. The light source 17 for emitting the beam is configured to have three light sources each discharging visible laser light corresponding to red (r), green (g), and blue (b) as three primary colors. Each wavelength value of the visible light will be set to $\lambda r=640$ nm, $\lambda g=530$ nm, and $\lambda b=450$ nm, respectively.

The outline of operations according to the embodiment will be described. Referring to FIG. 1, a system control unit 4 receives various setting information μCOM such as operation conditions for not shown CPU, and video synchronization signal inputs 1, 2, and generates control information required to realize the WXGA resolution, for example, horizontal frequency information (H_Freq), horizontal phase information (H_phas), vertical frequency information (V_Freq), vertical phase information (V_phas) so that such information is output. Furthermore, the system control unit 4 generates and outputs a writing signal Wadd for controlling writing of the image data iVideo input to a video input 3 into an image memory 14. In this case, as a RAM is employed as the image memory 14, the image memory 14 will be referred to as an image RAM 14. The arbitrary memory other than the RAM may be employed.

The mirrors 11, 12 oscillated by resonance (H-axis) and dissonance (V-axis) have each resonance frequency and oscillation width (amplitude) fluctuated depending on the service condition, for example, environmental temperature, laser light intensity, aging deterioration and the like. A mirror control unit 5 is configured to execute feedback control so as to keep the resonance frequency and the amplitude constant by suppressing the above-described fluctuations, which will be described as below. The mirror control unit 5 receives the control information (horizontal frequency/phase information, vertical frequency/phase information) from the system control unit 4, and signals from a scanning position determination unit 13, corresponding to detected phases and amplitudes of the mirrors 11, 12. The signals Hposition and Vposition each as the oscillation state signal indicate the phases and amplitude values of the mirrors 11, 12. Those signals are input to the mirror control unit 5 as the feedback signals. In reference to the control information (horizontal frequency/phase information, vertical frequency/phase information), the mirror control unit 5 generates and outputs a horizontal waveform reading address Hadd and a vertical waveform reading address Vadd under PLL (Phase Locked Loop) control by using the oscillation state signals (Hposition and Vposition) as the feedback signals.

The horizontal waveform reading address Hadd and the vertical waveform reading address Vadd from the mirror control unit 5 allow data of H-axis SIN waveform Hwv and V-axis sawtooth waveform Vwv stored in a waveform LUT (Look Up Table) 7 to be read so that the H-axis SIN waveform Hwv and the V-axis sawtooth waveform Vwv have desired frequency and phase values. The stored contents of the waveform LUT 7 may be rewritten with the various setting information μCOM. The mirror control unit 5 generates amplitude control signals H_AMP and V_AMP from the control information and the oscillation state signal, and allows multipliers 8, 9 to multiply data of the H-axis SIN waveform Hwv and the V-axis sawtooth waveform Vwr read from the waveform LUT 7 by the amplitude control signals H_AMP and V_AMP so that the H-axis SIN waveform Hwv and the V-axis sawtooth waveform Vwv have the desired oscillation angles +/−θh and +/−θv, respectively.

Output signals (data of H-axis SIN waveform Hwv and V-axis sawtooth waveform Vwv each having the amplitude controlled) from the multipliers 8, 9 are input to a mirror drive unit 10. The mirror drive unit 10 generates drive signals Hdrive/Vdrive adapted to the mirrors 11, 12 from the output signals of the multipliers 8, 9, and applies the generated signals to the mirrors 11, 12. This ensures to suppress fluctuation in the resonance frequency and the amplitude as described above so as to be kept substantially constant.

Each of the mirrors 11, 12 has a function of detecting amplitudes thereof, and outputting detection signals Hsensor/Vsensor. The scanning position determination unit 13 is configured to receive the detection signals Hsensor/Vsensor output from the mirrors 11, 12, generating the oscillation state signals Hposition/Vposition indicating the respective phases and the amplitude values, and outputting those signals to the mirror control unit 5 as feedback signals.

Upon reception of the oscillation state signals Hposition/Vposition from the scanning position determination unit 13, a laser control unit 6 generates synchronization signals HLDsync/VLDsync in the H-axis and V-axis directions, a pixel address to achieve projection with the WXGA resolution onto the same scanning position at the same angle of view, and the line address. The synchronization signals HLDsync/VLDsync are supplied to an image processing unit 15, and used for image processing performed by the image processing unit 15 by the unit of line or frame. The pixel address and the line address are supplied to the image RAM 14 for reading image data video from the image RAM 14. The laser control unit 6 will be described in detail later.

The image data video read from the image RAM 14 are subjected to the image processing by the image processing unit 15, for example, pixel interpolation, luminance correction, and the like in reference to the synchronization signals HLDsync/VLDsync. The image data LDvideo which have been image processed by the image processing unit 15 are supplied to a light source control drive unit 16 that generates a drive signal LD Drive adapted to the light source 17 based on the image data LDvideo for driving the light source 17. The light source 17 then generates the laser light modulated by the pixel unit in accordance with the image data. In the case where the light source 17 includes three light sources which emit R-beam, G-beam, and B-beam, those light sources are driven by the image data for the R-beam, G-beam, and B-beam, respectively.

The laser light from the light source 17 is condensed by a condensing lens 18, and is emitted toward the mirror 11 as the beam. As the mirrors 11, 12 are oscillated in the horizontal and vertical directions, respectively by the drive signals Hdrive/Vdrive, the beam reflecting from the mirror 11 is projected to scan a display region 20 as indicated by a trajectory 19. As a result, a projection video is formed on a display region 20.

The above-described structure allows the laser control unit 6 to implement the display with the same number of pixels in spite of fluctuation in the reciprocative scanning period of the horizontal raster scanning.

In order to improve the projection video quality of the above-structured projection type display device, for example, to achieve high luminance and high resolution, it is preferable to drive the light source 17 with the laser modulation clock at the frequency adapted to the resonance frequency, the resolution and the nonradiative period (flyback period). In the case where the laser modulation clock is at the fixed frequency, insufficient resolving property (to be described in detail later) of the display pixel may cause uneven pixel arrangement owing to the arithmetic error depending on the scanning position in the horizontal scanning direction, resulting in missing of the pixel. The missing of pixel may cause uneven pixel width of the projection video, lack of pixel, luminance unevenness and the like.

Figure 4:
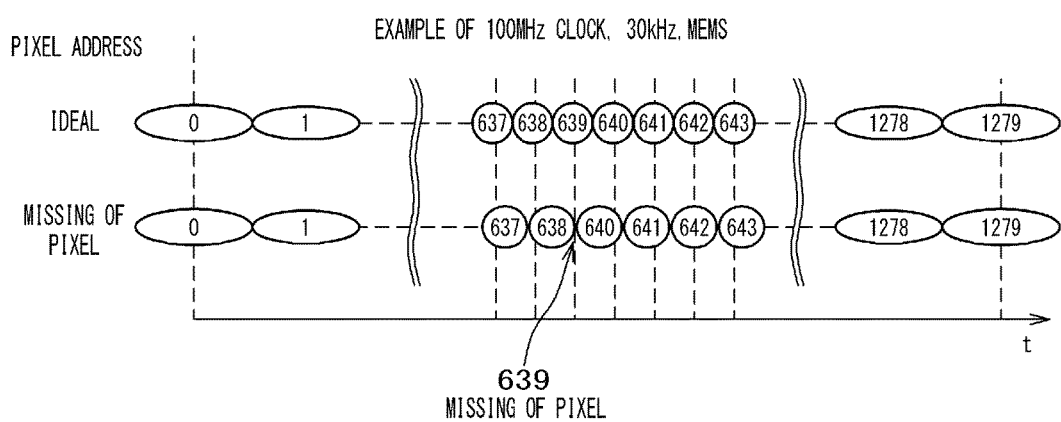
FIG. 4 is a view representing missing of the pixel according to the first embodiment of the present invention.

FIG. 4 represents the state of missing pixel. The drawing shows the pixel address at which the light source and the oscillation mirrors are driven with the laser modulation clock at the fixed frequency of 100 MHz, and the drive signal Hdrive at the horizontal drive frequency of 30.0 kHz. As the drawing shows, in the ideal state, there is no missing of pixel address. Actually, missing of the pixel occurs due to insufficient resolving property of the display pixel as described above. The example of the drawing indicating the pixel missing state shows that the 639th pixel is missing. The embodiment is intended to solve the problem as described above, and will be described in detail hereinafter.

Referring to FIGS. 2, 3, 5, 6 in addition to FIG. 1, the operation of the scanning display device according to the first embodiment will be described.

Figure 3:
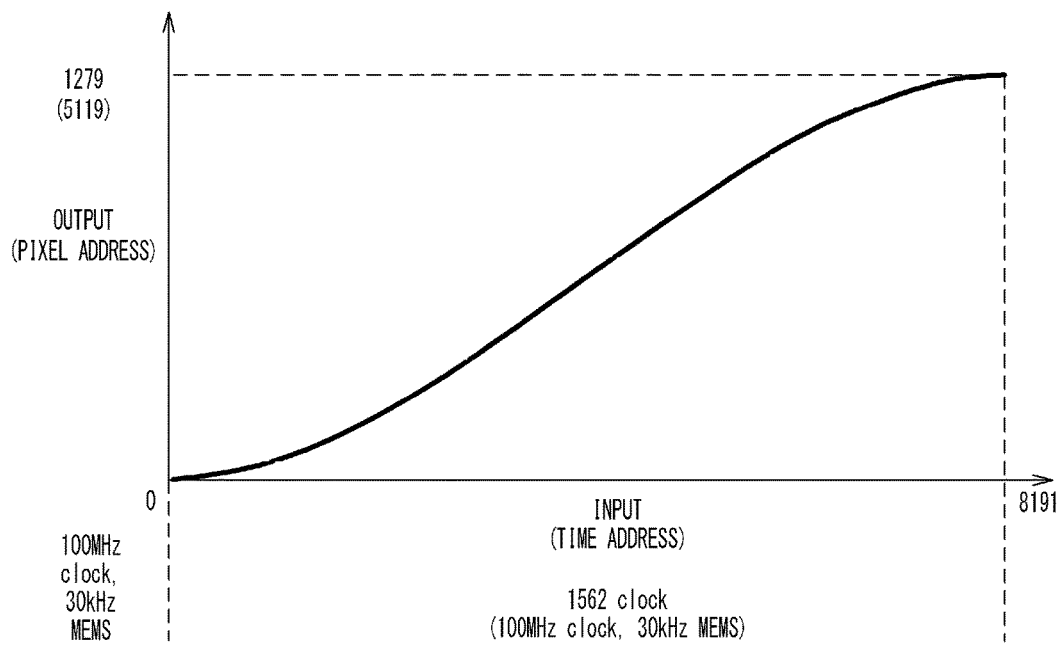
FIG. 3 is a view showing an example of a pixel address LUT according to the first embodiment of the present invention.
Figure 5:
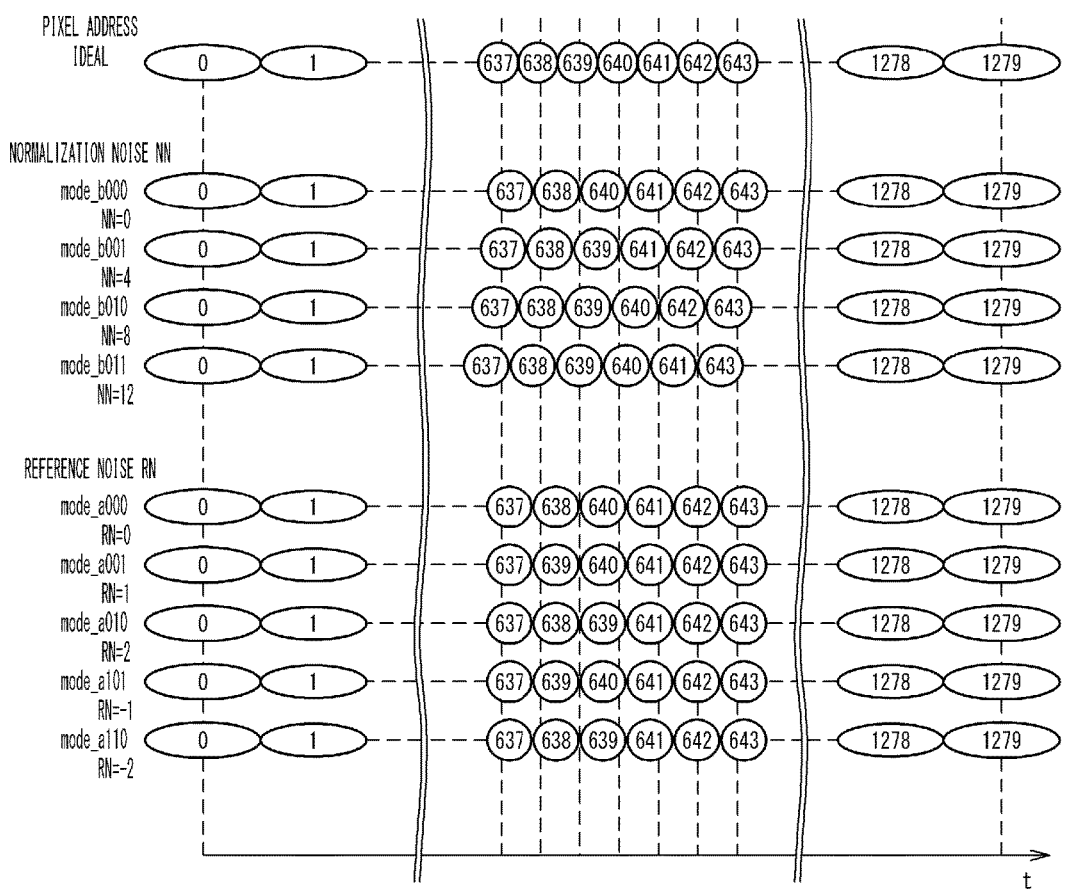
FIG. 5 is a view representing pixel expansion according to the first embodiment of the present invention.
Figure 6:
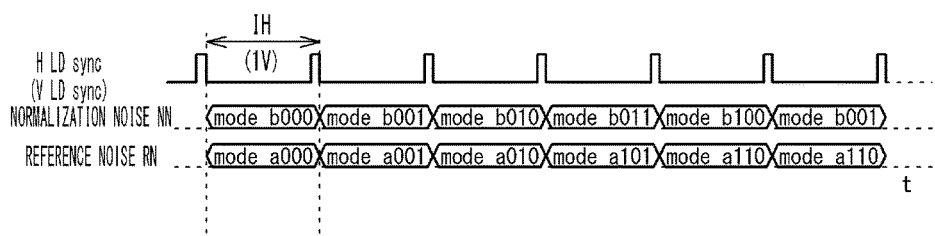
FIG. 6 is a timing chart according to the first embodiment of the present invention.

FIG. 2 is a view showing an example of the structure of the laser control unit 6 according to the first example. FIG. 3 is a view showing an example of the pixel address LUT (Look Up Table) according to the first example. FIG. 5 is a view showing the pixel expansion according to the first example. FIG. 6 is a timing chart of the noise signal according to the first example.

Referring to FIG. 1, the PLL control of the H-axis by the mirror control unit 5 is executed in the known way, and accordingly, detailed explanations will be omitted. As the resonant state is observed when the difference in phases between the drive waveform Hdrive and the Hsensor indicating the oscillation state of the mirror 11 is 90°, the control is executed to adjust the period of the drive waveform Hdrive, that is, the reading period of the H-axis SIN waveform so as to maintain the aforementioned relationship. Preferably, the adjustment step PS is set to the period of the laser modulation clock of Tld=10 nsec at the frequency fld=100 MHz. It is more preferable to lessen variation in the maximum oscillation angle of the mirror 11. The embodiment will be described on the assumption that the Tld is divided by 16, that is, PS=10/16 nsec.

The laser control unit 6 according to the embodiment will be described referring to FIG. 2. As the drawing shows, the laser control unit 6 according to the embodiment includes a scanning address generator 24, a dither noise generator 21, a normalizing unit 22, and a pixel address table (LUT) 23. The normalizing unit 22 includes a 1/N LUT 25, an adder 26, and a multiplier 27. The pixel address LUT 23 includes an adder 28 and a pixel address generator LUT 29.

The scanning address generator 24 generates the synchronization signals HLDsync and VLDsync adapted to the scan starting position on the H-axis or the V-axis in reference to the oscillation state signals Vposition and Hposition from the scan position determination unit 13, and the line address in the V-axis direction. As described above, the synchronization signals HLDsync and VLDsync are supplied to the image processing unit 15 and to the dither noise generator 21. As described above, the line address is used for reading the image data from the image RAM 14. Furthermore, the scanning address generator 24 counts each scanning period on the forward and backward scanning passages of the mirror 11 in the resonance state with the laser modulation clock at frequency fld=100 MHz, and generates a clock address to and the total number TN (integer) of the clocks as the scan address information. The total number TN may be derived from the following formula.

$$TN = \text{int}(fld/fhm/2) \quad \text{(Formula 1)}$$

where TN=int(100 MHz/30 kHz/2)=1666 in the embodiment.

The method of generating a time address tadd performed by the normalizing unit 22 will be described. The embodiment is configured to normalize each of the scanning periods into 8192 equal sections with accuracy approximately 4.9 times as high as the TN. The time address tadd (0 to 8191, 13-bit) may be defined by the following formula.

$$tadd = \text{int}(tn/TN*8191) \quad \text{(Formula 2).}$$

The normalizing unit 22 according to the embodiment is configured to allow the multiplier 27 to multiply the 1/N result output from the 1/N LUT 25 as shown in FIG. 2 by the clock address ta (0 to 1665) for normalization to tadd=0 to 8191.

The normalization keeps the tadd in the range from 0 to 8191 in spite of fluctuation in the resonance frequency fhm, that is, the TN value of the mirror 11.

Figure 10:
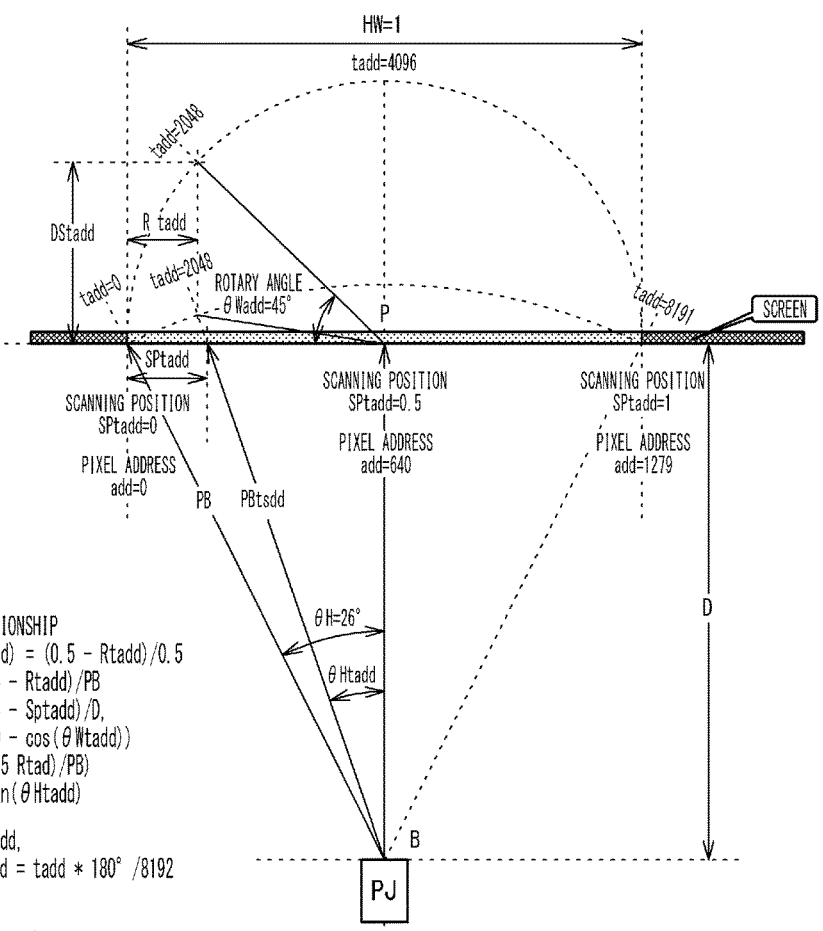
FIG. 10 is a view representing a positional configuration of the scanning display device according to the embodiment.

The pixel address LUT 23 reads the horizontal scanning position corresponding to the time address tadd, that is, the pixel address add (11-bit, 0 to 1279) with the resolution WXGA. The graph of FIG. 3 shows an example of the pixel address add which is derived from the following conversion formula in the case of H oscillation angle θH=+/−26° as shown in FIG. 10.

$$\text{add}=\text{int}(1280*(0.5-D*\tan(a\sin(0.5*\cos(\theta Wtadd)))/0.5/\sin(\theta H))))) \quad \text{(Formula 3)}$$

The rotary angle θWtadd at the time address tadd is derived from the following formula.

$$\theta Wtadd=180°*tadd/8192 \quad \text{(Formula 4)}$$

In the case of considering the fry-back period (display prohibition period), the pixel address is assigned in the time region excluding the corresponding fry-back period.

Focusing on the pixel address add=640 around the center of the screen according to the embodiment, the tn=832 to 833 is obtained in the step of 100 MHz clock, and values of 4090 and 4095 are obtained as the corresponding time address tadd normalized with 8191. As FIG. 4 shows, the pixel address Add=639 is not selected and missed. The embodiment is configured to generate a normalization noise NN and a reference noise RN by the dither noise generator 21, generate the time address tadd by allowing the adder 26 to add the normalization noise NN to the total number TN of the laser modulation clocks for normalization performed by the normalizing unit 22, and generate the pixel address add by allowing the adder 28 to add the reference noise RN to the time address tadd. The data for generating the normalization noise NN and the reference noise RN are stored in the dither noise generator 21 with the various setting information μCOM. It is also possible to rewrite those data with the various setting information μCOM.

In the case of adjustment step PS=10/16 nsec under the aforementioned PLL control, the step PS needs the fluctuation period corresponding to 16 steps for changing the total number of the laser modulation clocks, that is, TN=1666 (integer) caused by fluctuation in the resonance frequency. During the period, the respective pixels of the projection video will be projected each with the fluctuation corresponding to 1 pixel or smaller.

The desired normalization noise NN generated by the dither noise generator 21 may be acquired as the quantity derived from simulative division by 16 steps through selection from the integers ranging from −15 to 15. The normalizing unit 22 executes the normalization in accordance with the following formula (formula 5) as the modified formula 2.

$$tadd=\text{int}(tn/(TN+NN/16)*8191) \quad \text{(Formula 5)}$$

The normalizing unit 22 as shown in FIG. 2 expands the reference address in the LUT by the low order 4 bits to normalize the tn to with 8192 in reference to the 1/N LUT 25 by using the result of TN+NN/16.

As the normalization noise NN of FIG. 5 shows, the pixel address add is referred to the time address tadd upon assignment of NN=0, 4, 8, 12 to the mode_b000 to 011 in the formula 5. This applies to the normalization noise NN=0, −4, −8, −12. This makes it possible to arrange the respective pixels on the gravity center in the ideal state of the pixel arrangement as shown in FIG. 5.

It is sufficient to set the number of the normalization noises NN to two or more, that is, 0 and 8.

The normalizing unit 22 may be configured to take a different countermeasure with respect to the arithmetic error. For example, in the formula 5, instead of the integer derived from truncating a fractional part, the value derived from rounding may be used for generating the time address tadd through the similar process. Expansion of the operation mode ensures further smoothing operation.

The time address tadd (0 to 8191) is obtained by discretizing the laser modulation clock address to (0 to 1665) by approximately 4.9 times with discontinuity. The desired reference noise RN of the dither noise generator 21 is set to the value from −2 to 2 (integer). The pixel address LUT 23 as shown in FIG. 2 allows the adder 28 to add the noise to the time address tadd. Then the pixel address add is allowed to change within the range of +/−0.5 pixels in reference to the pixel address generator LUT 29. The reference noise of FIG. 5 represents an example resulting from assignment of 0, 1, 2, −1, −2 to the mode_a000 to 110. The pixel numbers in the drawing are shown only for conceptual representation.

The reference noise RN may be determined in accordance with accuracy of the normalization in use. Arbitrary value may be set so long as the pixel address add is within the range of +/−0.5 pixels.

Switching of the mode between the normalization noise NN and the reference noise RN, and the mode generation order may be set at arbitrary timing so long as the condition improves the display quality of the projection video. FIG. 6 is a timing chart representing an example of switching the mode by the unit of synchronization signal HLDsync on H-axis or VLDsync on V-axis. Depending on the switching timing and the mode generation order, flashing (flickering) in a part of the projection video, or non-uniform pixel size and the luminance unevenness may be observed unsettled. Even in the same mode switching condition, judgment with respect to the improvement may be changed as the resonance frequency fluctuates. Therefore, it is possible to set the mode switching condition which allows the optimum timing and the optimum quantity at the respective resonance frequencies.

Preferably, the control accuracy of the mirror control unit is higher than that of resolving the display resolution by at least twice (16 times in the embodiment) or more, and the normalization accuracy of the normalizing unit is higher than that of resolving the display resolution at least twice (4.9 times) or more.

The embodiment allows expansion and equalization of the pixel address distribution while retaining the gravity center of the pixel in spite of the high resonance frequency and expansion of the oscillation quantity of the micro-mirror, and the fixed laser modulation frequency. This makes it possible to implement the high resolution display while retaining the display video quality and luminance. It is possible to expand the oscillation quantity for ensuring the display region. This makes it possible to improve the luminance or reduce the average intensity of the laser as a result of improved laser utilization efficiency.

Control of increase in the laser modulation frequency adapted to the resonance frequency and resolution may suppress difficulty in the design of laser driving transmission path, response loss upon modulation, and power increase.

It is possible to implement diffusion and equalization of the pixel address distribution by the similar process as described above even in the case of the display with the desired resolution by increasing the laser modulation frequency. This makes it possible to uniformize the pixel size.

In the embodiment, the explanation has been made particularly with respect to the arithmetic accuracy and the formula. It is to be understood that the similar effects may be derived from the process similar to the one according to the embodiment by optimally setting the accuracy adapted to the structure to be applied, performance of the mirror element, and the laser modulation frequency.

Second Embodiment

Figure 7:
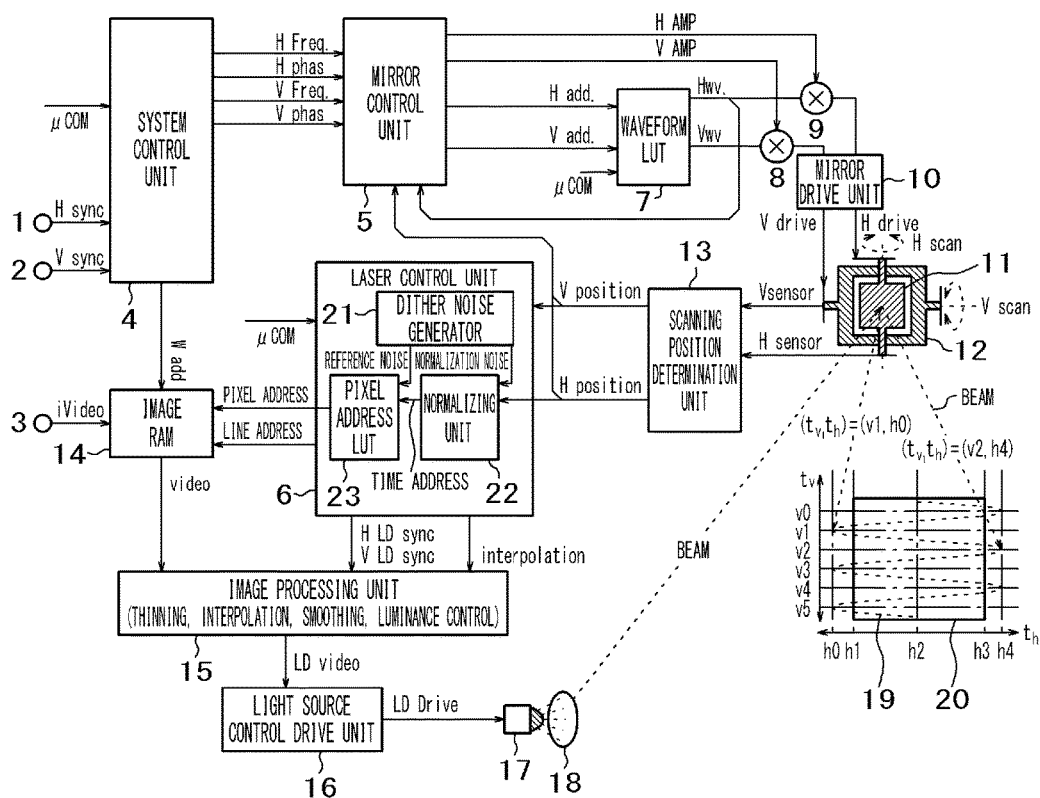
FIG. 7 is a block diagram of a scanning display device according to a second embodiment of the present invention.

FIG. 7 is a block diagram of the scanning projection display device according to a second embodiment. The image processing unit 15 is configured by imparting functions of the pixel thinning and interpolation in the horizontal direction, and smoothing between pixels to the structure according to the first embodiment. The embodiment will be described referring to conceptual views of FIGS. 4 and 8.

The mirror 11 which oscillates with respect to the H-axis moves slowly at both ends of the screen, and moves rapidly at the center. In the case of the laser modulation clock with fixed fld=100 MHz, the time taken for assignment of the respective pixel addresses may vary even in the ideal state as shown in FIG. 4. For example, the same pixel address sequences a plurality of times at both ends of the screen. Meanwhile, the pixel address is observed only once, or missing at the center.

Then the pixel address add (11-bit) information stored in the pixel address LUT 23 is expanded four times (13-bit) as large as the first embodiment by adding three types of pixel gravity center information (2-bit=00/10/11) with respect to the left side, the center, and the right side in the range from 0 to 5119, which will be in reference to the time address Tadd (13-bit, 0 to 8191) as described in the first embodiment.

(Explanation of Pixel Thinning)

Figure 8:
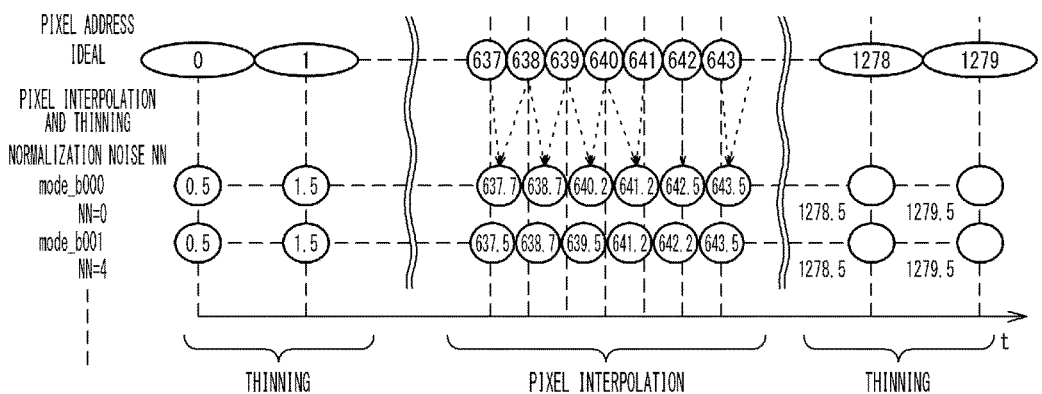
FIG. 8 is a conceptual view representing the pixel interpolation and thinning according to the second embodiment of the present invention.

In the case where the same high-order 11-bit (focused address) of the pixel address add is arranged in sequence, for example, in the region at both ends of the screen as shown in FIG. 8, the laser light is emitted with the video signal Video to which only the pixel address add of the initial time address Tadd corresponds, having the pixel gravity center located at the center (low-order 2-bit=10). In other words, the light is emitted only for the single clock period of the laser modulation clock fld in spite of the same pixel address add.

(Explanation of Pixel Interpolation)

In the region at the center of the screen as shown in FIG. 8, in the state where the high-order 11-bit of the focused pixel address add is different between adjacent clock units of the laser modulation clock fld, the laser is emitted through interpolation with the video signal Video corresponding to the pixel address add depending on the pixel gravity center information (2-bit=00/10/11) of the focused pixel address add. For example, the laser is emitted to (1) the focused pixel address add and the preceding address (−1) at the side to the left of the pixel gravity center, (2) only the focused pixel address add at the center, and (3) the focused pixel address add and the subsequent address (+1) at the side to the right of the pixel gravity center, respectively. In this embodiment, upon interpolation of the video signal, the above-described gravity center information is used. The interpolation method such as smoothing and highlighting of the video signal may be referred to the known art, explanation of which will be omitted in the embodiment. The pixel is displayed with the video signal conforming to shifting of the pixel gravity center.

Upon smoothing of the shifting in the pixel gravity center caused by addition of the normalization noise NN as described in the first embodiment, the pixel is displayed with the video signal conforming to the shifting in the pixel gravity center.

In the embodiment, the display resolution of the pixel address LUT 23 is increased by four times (2-bit expansion). It is preferable to retain the higher accuracy by at least 2 times or more. It is to be readily understood that the accuracy may be kept higher than the display resolution by four or more times.

The embodiment is configured to implement the same laser emission period for displaying the single pixel irrespective of the scanning position of the mirror 11, resulting in the video with even luminance in the plane. Unlike the first embodiment configured to prevent deterioration in resolution at the center in the plane by adding the normalization noise NN, while having the blurred pixel, this embodiment ensures to cope with the blurred pixel, thus preventing deterioration in the display quality.

Third Embodiment

Figure 9:
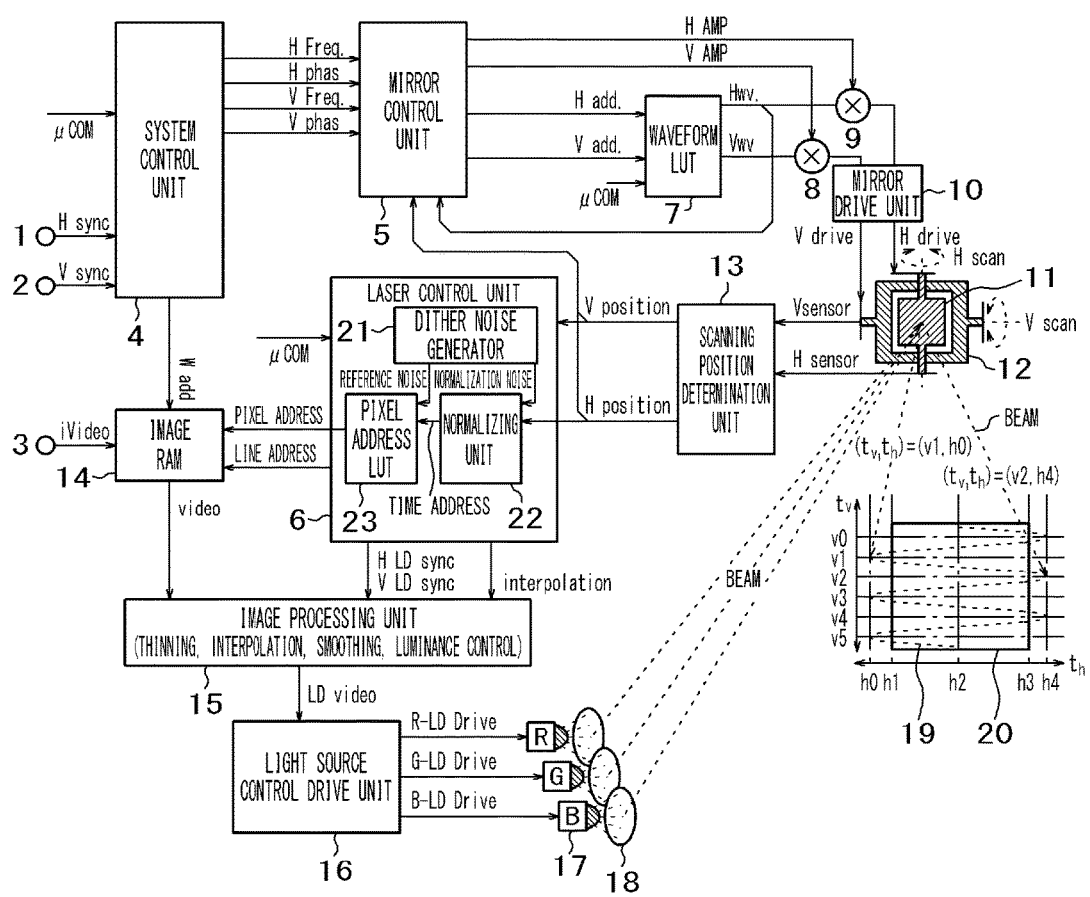
FIG. 9 is a block diagram of a scanning display device according to a third embodiment of the present invention.

FIG. 9 is a block diagram of the display device according to a third embodiment. The image RAM stores and reproduces image data in three primary colors including red (R), green (G), and blue (B). The laser light source 17 includes light sources for three primary colors of red (R), green (G), and blue (B), and includes the corresponding condensing lenses 18.

If the three beams are used for scanning different positions on the display region 20, the process similar to the first and the second embodiments may be executed for the respective colors.

The third embodiment allows the color video display with RGB.

Any one of the first to the third embodiments achieves equalization of the pixel through equalization by the similar process even if the laser modulation frequency is increased to realize the display with desired resolution.

It is to be understood that the mirror structure, driving method, arithmetic processing performed by the arithmetic unit, or the respective LUTs may be arbitrarily determined in accordance with the applicable apparatus and usage without being limited to those described above.

REFERENCE SIGNS LIST

1,2,3: video signal input
4: system control unit
5: mirror control unit
6: laser control unit
7: waveform LUT
8,9: multiplier
10: mirror drive unit
11,12: biaxial mirror
13: scanning position determination unit
14: image RAM
15: image processing unit
16: light source control drive unit
17: light source
18: condensing lens
19: beam trajectory
20: display region
21: dither noise generator
22: normalizing unit
23: pixel address LUT
24: scanning address generator
25: 1/N LUT
26: adder
27: multiplier

The invention claimed is:

1. A scanning display device configured to project laser light modulated with image data by an oscillation mirror for scanning in vertical and horizontal directions, comprising:
   an image memory for storing the image data;
   a scanning position determination unit for determining vertical and horizontal scanning positions of the oscillation mirrors;
   a laser control unit for acquiring a pixel address corresponding to the scanning positions determined by the scanning position determination unit and reading pixel data in the image data corresponding to the pixel address from the image memory; and
   a light source control drive unit for driving a light source to emit the laser light modulated with the pixel data read from the image memory to the oscillation mirror,
   wherein the laser control unit includes:
   a dither noise generator configured to generate normalization noise,
   a normalizing unit for adding the normalization noise to normalize a time address corresponding to the horizontal scanning position of the oscillation mirror, which has been determined by the scanning position determination unit, and outputting the normalized time address to which the normalization noise is added, and
   a pixel address table which holds a plurality of pixel addresses including the pixel address, and
   wherein the pixel address corresponding to the normalized time address is acquired in reference to the pixel address table to read the pixel data corresponding to the pixel address in the image data from the image memory.

2. The scanning display device according to claim 1, wherein the normalization noise is generated by the dither noise generator corresponding to the vertical scanning position of the oscillation mirror.

3. The scanning display device according to claim 1, wherein:
   the dither noise generator is further configured to generate reference noise, and
   the pixel address corresponding to the normalized time address, to which the reference noise is added, is acquired from the pixel address table to read the pixel data corresponding to the pixel address in the image data from the image memory.

4. The scanning display device according to claim 3, wherein the dither noise generator is configured to generate the normalization noise and the reference noise according to the vertical and horizontal scanning positions and a frame period of the image data.

5. The scanning display device according to claim 4, wherein:
   at least one of the normalization noise or the reference noise includes two or more noise modes; and
   the noise modes are switched for each horizontal scanning period or each vertical scanning period of the image data.

6. The scanning display device according to claim 1, further comprising:
   a mirror drive unit and a mirror control unit configured to execute a PLL control so that the oscillation mirror constantly retains a maximum oscillation angle.

7. The scanning display device according to claim 6, wherein:
   a control accuracy of the mirror control unit is higher than that for resolving a display resolution by twice or more;
   a normalizing accuracy of the normalizing unit is higher than that for resolving the display resolution by twice or more; and
   an accuracy of the pixel addresses of the pixel address table is higher than that of the display resolution by twice or more.

8. A scanning display device configured to project laser light modulated with image data by an oscillation mirror for scanning in vertical and horizontal directions, comprising:
   an image memory for storing the image data;
   a scanning position determination unit for determining vertical and horizontal scanning positions of the oscillation mirrors;
   a laser control unit for acquiring a pixel address corresponding to the scanning positions determined by the scanning position determination unit and reading pixel data in the image data corresponding to the pixel address from the image memory; and
   a light source control drive unit for driving a light source to emit the laser light modulated with the pixel data read from the image memory to the oscillation mirror,
   wherein the laser control unit includes:
   a dither noise generator configured to generate noise,
   a normalizing unit for adding the noise generated by the dither noise generator to the horizontal scanning position of the oscillation mirror, which has been determined by the scanning position determination unit, and outputting the normalized horizontal scanning position to which the noise is added, and
   a pixel address table which holds a plurality of pixel addresses including the pixel address, and
   the pixel address corresponding to the horizontal scanning position normalized by the normalizing unit is acquired in reference to the pixel address table to read the pixel data corresponding to the pixel address in the image data from the image memory,
   wherein, in the case where the referred display pixel address is positioned between adjacent pixels, both pixel data of the adjacent pixels are read from the image memory, and interpolation is executed in accordance with a center of gravity between the adjacent pixels.

9. The scanning display device according to claim 1, wherein:
   the image memory stores the image data of three primary colors of red (R), green (G), and blue (B); and
   the light source includes three laser light sources of red (R), green (G), and blue (B) light modulated with the image data read from the image memory to the oscillation mirror.

* * * * *